United States Patent
Chuh

(10) Patent No.: US 10,028,097 B1
(45) Date of Patent: Jul. 17, 2018

(54) METHOD OF PROCESSING USER LOCATION INFORMATION BASED ON NON-PERIODIC UPDATE

(71) Applicant: ISHARINGSOFT, INC., Seoul (KR)

(72) Inventor: Yongjae Chuh, Seoul (KR)

(73) Assignee: ISHARINGSOFT, INC., Seoul (KR)

( * ) Notice: Subject to any disclaimer, the term of this patent is extended or adjusted under 35 U.S.C. 154(b) by 0 days.

(21) Appl. No.: 15/706,920

(22) Filed: Sep. 18, 2017

(30) Foreign Application Priority Data

Mar. 17, 2017 (KR) ........................ 10-2017-0033991

(51) Int. Cl.
| | |
|---|---|
| *H04W 4/00* | (2018.01) |
| *H04W 4/02* | (2018.01) |
| *G06F 3/0482* | (2013.01) |
| *G01S 19/42* | (2010.01) |
| *H04W 88/02* | (2009.01) |

(52) U.S. Cl.
CPC ............. *H04W 4/025* (2013.01); *G01S 19/42* (2013.01); *G06F 3/0482* (2013.01); *H04W 88/02* (2013.01)

(58) Field of Classification Search
CPC ..... H04W 4/025; H04W 88/02; G06F 3/0482; G01S 19/42
See application file for complete search history.

(56) References Cited

U.S. PATENT DOCUMENTS

| | | | |
|---|---|---|---|
| 8,099,112 B2 * | 1/2012 | Krishnamurthi ........ | H04W 4/02 455/456.1 |
| 9,955,298 B1 * | 4/2018 | Haney ................... | H04W 4/022 |

(Continued)

FOREIGN PATENT DOCUMENTS

| | | |
|---|---|---|
| KR | 10-2011-0047657 A | 5/2011 |
| KR | 10-2013-0022550 A | 3/2013 |

(Continued)

OTHER PUBLICATIONS

An Office Action issued by the Korean Patent Office dated Nov. 8, 2017, which corresponds to Korean Patent Application No. 10-2017-0033991 and is related to U.S. Appl. No. 15/706,920; with English language ranslation.

*Primary Examiner* — Khai M Nguyen

(74) *Attorney, Agent, or Firm* — Studebaker & Brackett PC

(57) ABSTRACT

A method for processing user location information based on non-periodic update includes at least: requesting installation of a location processing agent controlling a location measurement sensor from the at least one location information providing terminal; receiving a request for approval of at least one location information providing terminal from a location information requesting terminal and providing a link message accepting the approval request of the at least one location information providing terminal; if a request for location of a specific location information providing terminal is received from the location information requesting terminal, requesting the corresponding location information from the corresponding location processing agent; and if the location measurement sensor is successfully controlled by the corresponding location processing agent, receiving location information of the specific location information providing terminal from the corresponding location processing agent.

7 Claims, 4 Drawing Sheets

(56) References Cited

U.S. PATENT DOCUMENTS

| | | | | |
|---|---|---|---|---|
| 2007/0082681 | A1* | 4/2007 | Kim | H04W 8/10 |
| | | | | 455/456.1 |
| 2010/0267398 | A1* | 10/2010 | Kim | H04W 8/10 |
| | | | | 455/456.3 |
| 2011/0098057 | A1* | 4/2011 | Edge | G01S 5/0018 |
| | | | | 455/456.1 |
| 2012/0190339 | A1* | 7/2012 | Abe | H04W 48/16 |
| | | | | 455/411 |
| 2014/0324816 | A1* | 10/2014 | Bennett | G06F 17/30864 |
| | | | | 707/709 |

FOREIGN PATENT DOCUMENTS

| | | |
|---|---|---|
| KR | 10-2013-0025047 A | 3/2013 |
| KR | 10-1518114 B1 | 5/2015 |

* cited by examiner

METHOD OF PROCESSING USER LOCATION INFORMATION BASED ON NON-PERIODIC UPDATE

CROSS-REFERENCE TO RELATED APPLICATIONS

A claim for priority under 35 U.S.C. § 119 is made to Korean Patent Application No. 10-2017-0033991 filed Mar. 17, 2017, in the Korean Intellectual Property Office, the entire contents of which are hereby incorporated by reference.

FIELD OF THE INVENTION

The present invention is related to a method of processing user location information based on non-periodic update and more specifically, a method of processing user location information based on non-periodic update, capable of searching for and providing location of a target terminal upon a location search request for the one terminal.

DISCUSSION OF THE RELATED ART

Parents want a means to safeguard their children and easily identify locations of them. Location determination technology for children has evolved from an old skill of attaching name tags to children to the latest one utilizing a smartphone. Recent smartphones are equipped with a position sensing device, namely GPS receiver, by default. The GPS installed in a recent smartphone determines the position of the smartphone with a high accuracy but at the same time, consumes a large amount of battery power.

The Korean Patent Application No. 10-2013-0022550 describes a suspect tracking system comprising handcuffs put on both wrists of a suspect and equipped with a tracking device determining position of the handcuffs by using signals received from satellites and transmitting the position by using short range communication; a tracking smartphone displaying the position of the handcuffs on a map and in case the position of the handcuffs is not determined, transmitting the last position of the handcuffs determined successfully and the position of the smartphone itself determined from signals of the satellites; and a monitoring center server connected to a communication network of the smartphone and transmitting a final position of the handcuffs and the position of the tracking smartphone to a plurality of other tracking smartphones connected to the communication network of the smartphone.

The Korean Patent Registration No. 10-1518114 is related to a smartphone-based position tracking system and more specifically, a smartphone-based position tracking system capable of recognizing the current location or information about a movement path of a person or a pet holding a sensor terminal in an indoor environment of a high-rise building or in a public place crowded with people through short range wireless communication.

SUMMARY OF THE INVENTION

When there is a request for location from a location information requester, one embodiment of the present invention provides a method for processing user location information based on non-periodic update, capable of searching for a current location of a location information provider and providing the corresponding location information to the corresponding requester quickly and accurately.

One embodiment of the present invention provides a method for processing user location information based on non-periodic update, capable of detecting location change of a location information provider, determining whether a current location is a safe location by using the basic information of the corresponding provider, and informing a location information requester about the determination result.

Among embodiments, a method for processing user location information based on non-periodic update comprises requesting installation of a location-processing agent controlling a location measurement sensor (GPS) from the at least one location information providing terminal; receiving a request for approval of the at least one location information providing terminal from the location information requesting terminal and providing a link message accepting the approval request of the at least one location information providing terminal; if a request for location of a specific location information providing terminal is received from the location information requesting terminal, requesting the corresponding location information from the corresponding location processing agent; and if the location measurement sensor is successfully controlled by the corresponding location processing agent, receiving location information of the specific location information providing terminal from the corresponding location processing agent.

The requesting the corresponding location information from the corresponding location processing agent further comprises providing the most recent location information of the specific location information providing terminal if the time at which the location request is received is within a first specific time period since location has been provided in response to the last location request.

The requesting the corresponding location information from the corresponding location processing agent further comprises, if the time at which the location request is received is within a second specific time period larger than the first specific time period since location has been provided in response to the last location request, determining characteristics of a movement place of the specific location information providing terminal and determining whether to provide the most recent location information of the specific location information providing terminal or whether to newly receive location information from the corresponding location processing agent.

The receiving location information of the specific location information providing terminal further comprises, if the control fails due to the failure of the location measurement sensor, receiving an identifier of at least one base station related to the corresponding location information providing terminal and received signal strength from the corresponding base station and estimating location of the corresponding location information providing terminal by using the mathematical equation below.

$$L=L_i \pm D_i * k/\max\{S_i\}, \text{ where } i \text{ is satisfying with } \max\{S_i\} \quad \text{[Equation]}$$

In the equation above, L represents the estimated location of the corresponding location information providing terminal, $L_i$ the location of a base station i, $D_i$ distance between the most recent location of the corresponding location information providing terminal and the base station i, k correlation coefficient, Si strength of a signal received from the base station i, and $\max\{S_i\}$ the largest received signal strength among strengths of signals received from the base station i.

The receiving location information of the specific location information providing terminal further comprises, if the control fails due to shortage of battery of the location measurement sensor, providing a location request message requesting the corresponding location processing agent to enter the current location.

The receiving location information of the specific location information providing terminal further comprises, if the received location information leaves a safety zone designated by the user or enters a non-safety zone designated by the user, providing a notification message to the location information requesting terminal.

The receiving location information of the specific location information providing terminal further comprises, if the received location information does not change for a third specific time period since the first reception of the location information at the corresponding location, providing a notification message to the location information requesting terminal.

The present invention provides the following advantageous effects. However, since it is not meant that a specific embodiment should support all of the following effects or include only the following effects, the technical scope of the disclosed invention should be not regarded as being limited to the descriptions given below.

When there is a request for location from a location information requester, a method for processing user location information based on non-periodic update according to one embodiment of the present invention searches for a current location of a location information provider and provides the corresponding location information to the corresponding requester quickly and accurately.

A method for processing user location information based on non-periodic update according to one embodiment of the present invention detects location change of a location information provider, determines whether a current location is a safe location by using the basic information of the corresponding provider, and informs a location information requester about the determination result.

DETAILED DESCRIPTION OF THE EMBODIMENTS

Figure 1:
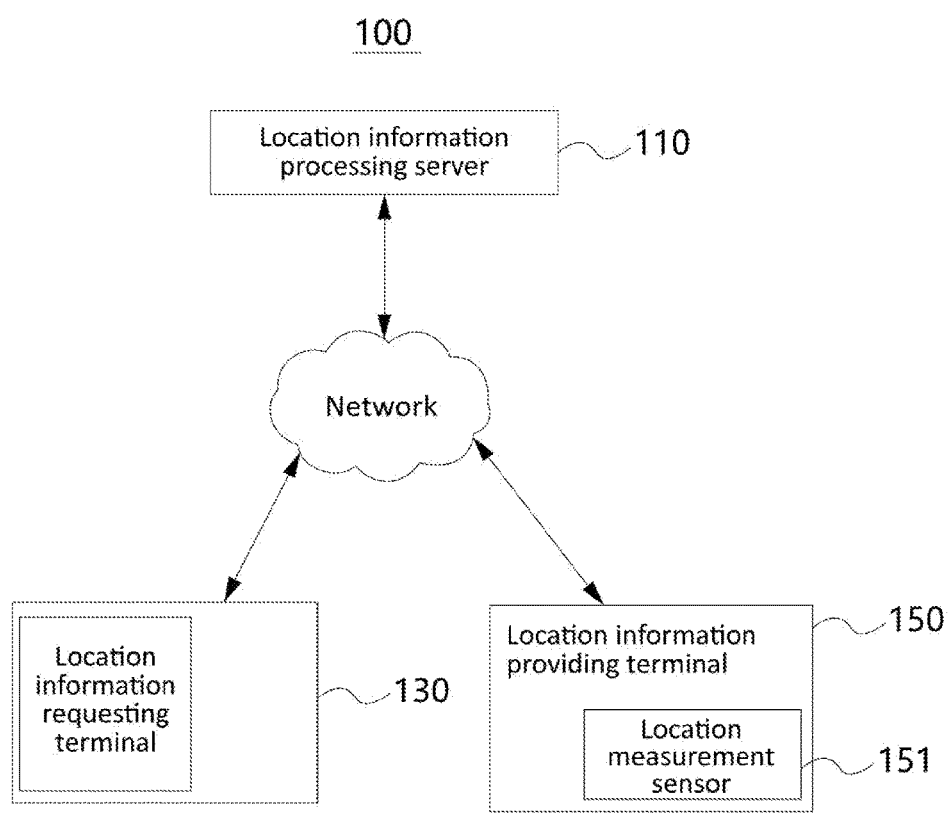
FIG. 1 illustrates a user location information processing system according to one embodiment of the present invention.

Since description of the present invention is merely an embodiment for illustrating structural or functional description, it should not be interpreted that the technical scope of the present invention is limited by the embodiments described in this document. In other words, embodiments may be modified in various ways and implemented in various other forms; therefore, it should be understood that various equivalents realizing technical principles of the present invention belong to the technical scope of the present invention includes. Also, since it is not meant that a specific embodiment should support all of the purposes or effects intended by the present invention or include only the purposes or effects, the technical scope of the disclosed invention should be not regarded as being limited to the descriptions of the embodiment.

Meanwhile, implication of the terms used in this document should be understood as follows.

The terms such as "first" and "second" are introduced to distinguish one element from the others, and thus the technical scope of the present invention should not be limited by those terms. For example, a first element may be called a second element, and similarly, the second element may be called the first element.

If a constituting element is said to be "connected" to other constituting element, the former may be connected to the latter directly, but it should be understood that another constituting element may be present between the two elements. On the other hand, if a constituting element is said to be "directly connected" to other constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe the operation order of the steps. Therefore, unless otherwise explicitly indicated in the context of description, the steps may be executed differently from the stated order. In other words, the respective steps may be performed in the same order as stated in the description, actually performed simultaneously, or performed in a reverse order.

The present invention may be implemented in the form of program codes in a computer-readable recording medium, where a computer-readable recording medium includes all kinds of recording apparatus which store data that may be read by a computer system. Examples of a computer-readable recording medium include ROM, RAN, CD-ROM, magnetic tape, floppy disk, and optical data storage device.

Unless defined otherwise, all of the terms used in this document provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

FIG. 1 illustrates a user location information processing system according to one embodiment of the present invention.

Referring to FIG. 1, a user location information processing system 100 comprises a location information processing server 110, location information requesting terminal 130, and location information providing terminal 150.

The location information processing server 110 may be realized by a server which corresponds to a computer or a program providing location information of the location information providing terminal 150 to the location information requesting terminal 130 through a network.

The location information requesting terminal 130 may be implemented by a smartphone, laptop or desktop computer, which is not necessarily limited to the aforementioned examples but may also be implemented by various devices such as tablet PCs. The location information requesting terminal 130 may be connected wirelessly to the location information processing server 110 through Bluetooth or WiFi and may receive location information from the location information processing server 110 according to the request of a location information requester.

The location information providing terminal 150 may be realized by a portable device such as a smartphone or tablet PC, which is not limited to the aforementioned example but may also be implemented by various devices including a location measurement sensor (GPS) 151.

The position information providing terminal 150 may be connected to the location information processing server 110 wirelessly through Bluetooth or WiFi and may install a location processing agent according to the request of a location information requester and provide location information to the location information processing server 110 through the location processing agent.

Figure 2:
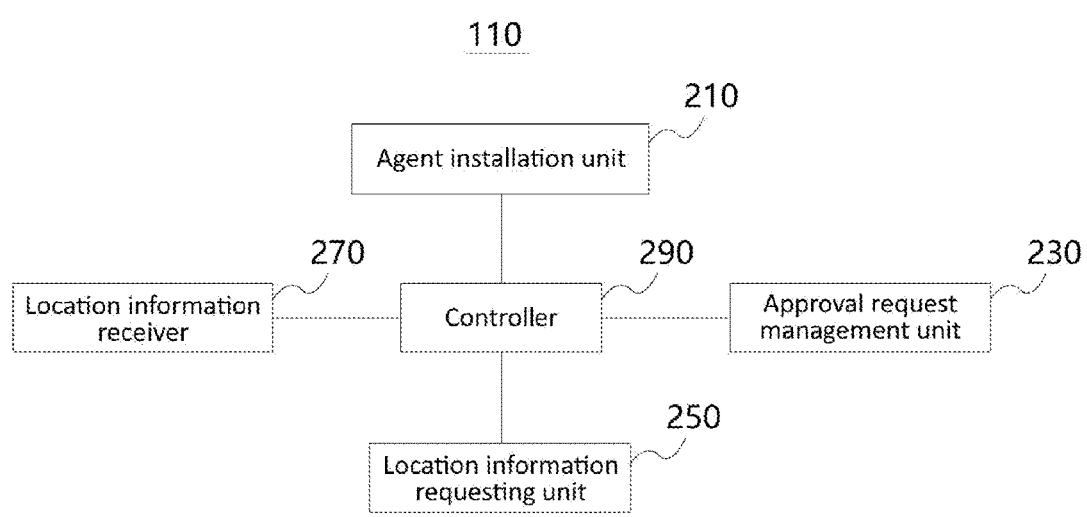
FIG. 2 is a block diagram illustrating the location information processing server of FIG. 1.

FIG. 2 is a block diagram illustrating the location information processing server of FIG. 1.

Referring to FIG. 2, the location information processing server 110 comprises an agent installation unit 210, approval request management unit 230, location information requesting unit 250, location information receiver 270, and controller 290.

The agent installation unit 210 installs a location processing agent in the location information providing terminal 150. The location processing agent may be implemented by a program capable of controlling the location measurement sensor 151 belonging to the location information providing terminal 150 or by a process running in the background.

In one embodiment, the location processing agent may control power consumption of the location measurement sensor 151 on the basis of at least one of the amount of battery charge of the location information providing terminal 150, location request type of the location information requesting terminal 130, and elapsed time since the location information has been received. The location processing agent may control power consumption by not providing power to the location measurement sensor 151 of the location information providing terminal 150 if the amount of battery charge is below a particular threshold.

The location request type of the location information requesting terminal 130 may correspond to one of requesting location of the location information providing terminal 150 for a particular time period in real-time after the current time, requesting the location every particular period, and requesting only the location at the current time.

The location processing agent may control power consumption by blocking power supply to the location measurement sensor 151 of the location information providing terminal 150 according to the location request type. The location processing agent may control power consumption by blocking power supply to the location measurement sensor 151 if a predetermined time period is passed since location information is provided to the location information processing server.

The approval request management unit 230 connects the location information requesting terminal 130 and the location information providing terminal 150 to each other, thereby enabling reception of subsequent location information to be performed easily and safely. The approval request management unit 230 may receive an approval request from the location information requesting terminal 130 and provide a message for permitting an approval request to the location information providing terminal 150.

At this time, the approval request may be a request for connecting the location information requesting terminal 130 to the location information providing terminal 150, a request for permission for providing location information with respect to the location information providing terminal 150, or a request for both of the connection between the terminals and permission for providing location.

In one embodiment, the approval request management unit 230 may provide a link message which receives an approval request with respect to at least one location information providing terminal 150 from the location information requesting terminal 130 and which approves permission of at least one location information providing terminal 150.

At this time, the link message allows the location information provider to confirm the approval request by clicking a link included in the message. The link message may be used to clearly check the intent of the location information provider and to form a secure connection relationship by using a link click action as a necessary condition.

If a location request is received from the location information requesting terminal 130, the location information requesting unit 250 may request the corresponding location information from the corresponding location processing agent. In one embodiment, the location information requesting unit 250 may provide the most recent location information of a specific location information providing terminal 150 if the reception time of a location request is within a first specific time period from the most recent time the location information is provided.

At this time, the first specific time period may be set to the location information requesting terminal 130 by a location information requester and may be set automatically by the location information processing server 110 by taking into account the server performance and network conditions.

The location information requesting unit 250 may assume that for consecutive location requests within a specific time period, movement of a location information provider is not possible or location is not changed. And under the assumption, the location information requesting unit 250 may provide the most recent location information of the location information providing terminal 150 instead of requesting location information from the location processing agent.

In one embodiment, if the reception time of a location request is within a second specific time period from the most recent time the location information was provided, which is larger than the first specific time period, the location information requesting unit 250 may determine characteristics of a movement place of a specific location information providing terminal 150 and determine whether to provide the most recent location information of the specific location information providing terminal 150 or whether to newly receive location information from the corresponding location processing agent.

At this time, the second specific time period may be longer than the first specific time period and corresponds to a time period in which a possibility of movement of a location information provider exists. The second specific time period may be set by the location information requesting terminal 130 by the location information requester and set automatically by the location information processing server 110 to be longer than the first specific time period by taking into account the server performance and network conditions.

The location information requesting unit 250 may utilize the characteristics of a movement place set by the location information requester and utilize the characteristics of a movement place determined automatically by taking into account the previous place use history of the location information provider. Characteristics of a movement place refers to a time range in which the location information provider is likely to stay depending on places.

More specifically, when the movement place is a school, location of the location information providing terminal 150 is constant until the end of school class. When the location information requester requests location while school class is in progress, the location information requesting unit 250 may determine to provide the most recent location information of the location information providing terminal 150. In case the movement place is a private academy, the location information requesting unit 250 may determine to provide the most recent location information of the location information providing terminal 150 until the end of class. In the case of a coffee shop, chances are that location of the location information providing terminal 150 is changed depending on situations, the location information requesting unit 250 may determine to newly receive the location information from the location processing agent.

The location information receiver 270 may receive location information of the location information provider 150 from the location processing agent. The location processing agent may obtain location information of the location information providing terminal 150 from the location measurement sensor 151.

When there is a location information request from the location information processing server 110, the location processing agent may check whether power may be provided to the location measurement sensor 151 and obtain the corresponding location information by activating the location measurement sensor 151.

In one embodiment, if control of the location measurement sensor 151 fails due to an error of the location measurement sensor 151, the location information receiver 270 may receive an identifier of at least one base station associated with the corresponding location information providing terminal 150 and strength of a signal received from the corresponding base station; and estimate the location of the corresponding location information providing terminal 150 by using the following mathematical equation.

$$L = L_i \pm D_i * k / \max\{S_i\}, \text{ where } i \text{ is satisfying with } \max\{S_i\}$$ [Equation]

In the equation above, L represents the estimated location of the corresponding location information providing terminal 150, $L_i$ the location of a base station i, $D_i$ distance between the most recent location of the corresponding location information providing terminal 150 and the base station i, k correlation coefficient, Si strength of a signal received from the base station i, and $\max\{S_i\}$ the largest received signal strength among strengths of signals received from the base station i.

When it becomes impossible to obtain location information of the corresponding location information providing terminal 150 due to a failure of the location measurement sensor 151, the location information receiver 270 may determine a base station exhibiting the largest signal strength from among the base stations capable of communicating with the corresponding location information providing terminal 150 and estimate the current location of the corresponding location information providing terminal 15 by using the distance from the corresponding base station, strength of a signal received from the corresponding base station, and location of the corresponding base station on the basis of the most recent location information of the corresponding location information providing terminal 150. The estimated location may correspond to a specific, circular area with respect to the location of the corresponding base station.

In one embodiment, if control fails due to shortage of battery of the location measurement sensor 151, the location information receiver 270 may provide a location request message requesting the corresponding location processing agent to input the current location.

Since power supply to the location measurement sensor 151 incurs significant battery consumption, to avoid the risk that power supply to the corresponding location information providing terminal 150 is suspended, location of the corresponding location information providing terminal 150 may be obtained through transmission of a message which requires less battery consumption. At this time, the location request message may correspond to a text message or a push notification message and may be provided together with a warning sound or vibration.

In one embodiment, if received location information leaves a safety zone designated by the user or enters a non-safety zone designated by the user, the location information receiver 270 may provide a notification message to the location information requesting terminal 130.

At this time, a safety zone refers to a place secured so that a location information requester doesn't have to pay special attention to the safety of the location information provider when location of the location information provider is inside the corresponding zone. A non-safety zone refers to a dangerous place so that the location information request has to pay special attention to the safety of the location information provider when location of the location information provider is inside the corresponding zone. A safety or non-safety zone may be set in the location information requesting terminal 130 by the location information requester or set automatically in the location information processing server 110 by past configuration records.

In one embodiment, the location information receiver 270 may provide a notification message to the location information requesting terminal 130 when received location information does not show any change for a third specific time period since the first reception of the location information at the corresponding location. At this time, the third specific time period may be set in the location information requesting terminal 130 by the location information requester, may use the characteristics of a movement place set by the location information requester, or may be set automatically by taking into account the previous place use records of the location information provider.

When location of the location information provider does not change for a predetermined time period, the location information receiver 270 may determine considering the characteristics of the corresponding location that the location information provider may be in a dangerous situation. A notification message may correspond to a text message or a push notification message and may be provided together with a warning sound or vibration.

The controller 290 may control the overall operation of the location information processing server 110 and manage a control flow or data flow among the agent installation unit 210, approval request management unit 230, location information requesting unit 250, and location information receiver 270.

Figure 3:
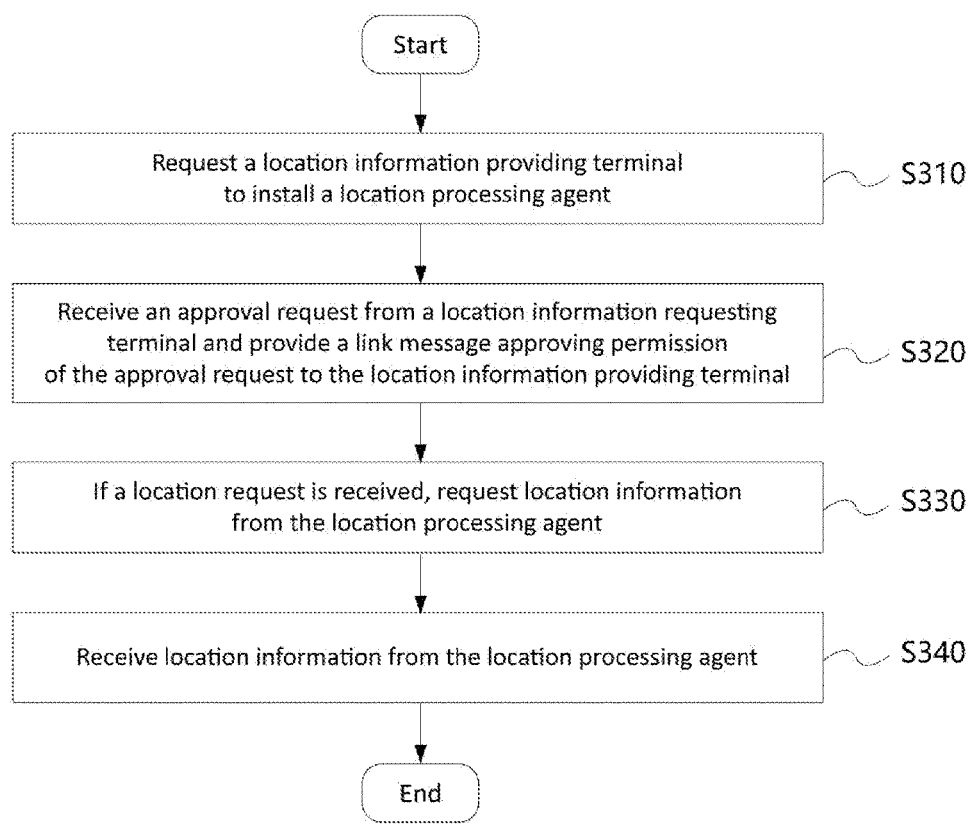
FIG. 3 is a flow diagram illustrating the process for the location information processing server of FIG. 2 to receive location information of a location information providing terminal.

FIG. 3 is a flow diagram illustrating the process for the location information processing server of FIG. 2 to receive location information of a location information providing terminal.

Referring to FIG. 3, the location information processing server 110 may request installing a location processing agent at the location information providing terminal 150 through the agent installation unit 210, S310.

In one embodiment, if a request for installing a location processing agent is received from the location information requesting terminal 130, the location information processing server 110 may request installing the location processing agent in the location information providing terminal 150 through the agent installation unit 210.

The location information agent may be installed in the location information providing terminal 150 even when there is no installation request from the location information processing server 110. More specifically, the location information requesting terminal 130 may request the location information processing server 110 to install a location processing agent and transmit an installation request message to the location information providing terminal 150. At this time, the installation request message may be a text message or an email; the message is not limited to the aforementioned example, however, which may be a message that may be transmitted among communication-enabled terminals through various communication methods. The location information providing terminal 150 may install a location processing agent by clicking a link included in the installation request message.

The location information processing server 110 may receive an approval request from the location information requesting terminal 130 through the approval request management unit 230 and provide a link message approving permission of the approval request to the location information providing terminal 150, S320.

If a location request is received, the location information processing server 110 may request location information from the location processing agent through the location information requesting unit 250, S330.

The location information processing server 110 may receive location information of the corresponding location information providing terminal 150 from the location processing agent through the location information receiver 270, S340.

In one embodiment, the location information receiver 270 may again request the corresponding location information from the location processing agent when there is no movable area on the basis of at least one of the most recent location of the received location information, the most recent time the location information was received, and status information of the user of the location information providing terminal 150.

The status information of the location information provider may include age, body condition, and mental condition. To be specific, the location information provider may correspond to elderly people, young children, disabled people, and people with a mental problem.

The location information receiver 270 may calculate the range of a movable area by taking into account the status of a location information provider on the basis of the most recent location and time. If the current location of the location information provider is found to be out of the corresponding range of a movable area, the location information receiver 270 may again request location information from the location processing agent considering in case location measurement is wrong.

Figure 4:
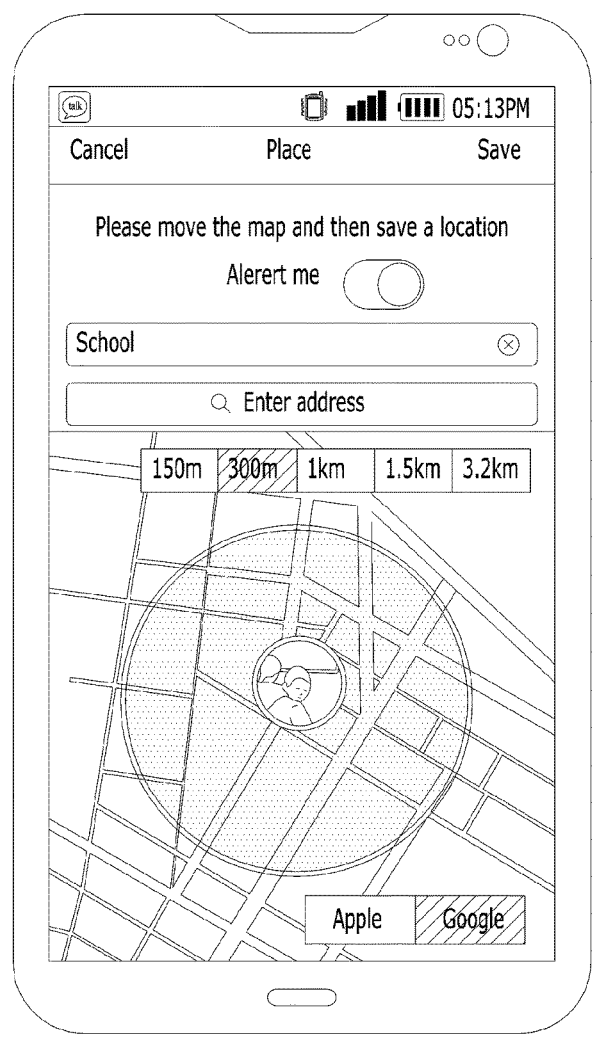
FIG. 4 illustrates one embodiment of a process for the location information processing server of FIG. 1 to provide location information of a location information providing terminal to a location information requesting terminal.

FIG. 4 illustrates one embodiment of a process for the location information processing server of FIG. 1 to provide location information of a location information providing terminal to a location information requesting terminal.

Referring to FIG. 4, the location information requesting terminal 130 may display location information of the location information providing terminal 150 received from the location information processing server 110 on a display device.

More specifically, if a location request is received from the location information requesting terminal 130, the location information processing server 110 may receive the current location of the location information providing terminal 150 through the location processing agent of the location information providing terminal 150. The location information processing server 110 may provide the current location information of the location information providing terminal 150 to the location information requesting terminal 130. The location information requesting terminal 130 may display the location information on a map so that the location information requester may easily recognize the location information.

FIG. 4 illustrates an example in which a school is set as a safety zone by a location information requester, and a notification message is configured to be sent when the location of the location information providing terminal 150 leaves out of the safety zone. The current location of the location information providing terminal 150, range of an area designated as a safety zone, designated distance, and so on may be displayed on the map.

Although the present invention has been described with reference to preferred embodiments given above, it should be understood by those skilled in the art that various modifications and variations of the present invention may be made without departing from the technical principles and scope specified by the appended claims below.

What is claimed is:

1. A method for processing user location information based on non-periodic update performed in a user location information processing server connected to a location information requesting terminal and at least one of location information providing terminal, comprising:

(a) requesting installation of a location processing agent controlling a location measurement sensor (GPS) from the at least one location information providing terminal;

(b) receiving a request for approval of the at least one location information providing terminal from the location information requesting terminal and providing a link message accepting the approval request of the at least one location information providing terminal;

(c) when a request for location of a specific location information providing terminal is received from the location information requesting terminal, requesting the corresponding location information from the corresponding location processing agent; and (d) when the location measurement sensor is successfully controlled by the corresponding location processing agent, receiving location information of the specific location information providing terminal from the corresponding location processing agent.

2. The method of claim 1, wherein the (c) step further comprises providing the most recent location information of the specific location information providing terminal when the time at which the location request is received is within a first specific time period since location has been provided in response to the last location request.

3. The method of claim 2, wherein the (c) step further comprises, when the time at which the location request is received is within a second specific time period larger than the first specific time period since location has been provided in response to the last location request, determining characteristics of a movement place of the specific location information providing terminal and determining whether to provide the most recent location information of the specific location information providing terminal or whether to newly receive location information from the corresponding location processing agent.

4. The method of claim 1, wherein the (d) step further comprises, when the control fails due to the failure of the location measurement sensor, receiving an identifier of at least one base station related to the corresponding location information providing terminal and received signal strength from the corresponding base station and estimating location of the corresponding location information providing terminal by using the mathematical equation below, $$L = Li \pm Di * k / \max\{Si\}, \text{ where } i \text{ is satisfying with } \max\{Si\}$$ [Equation]

wherein L represents the estimated location of the corresponding location information providing terminal, Li the location of a base station i, Di distance between the most recent location of the corresponding location information providing terminal and the base station i, k correlation coefficient, Si strength of a signal received from the base station i, and max{Si} the largest received signal strength among strengths of signals received from the base station i.

5. The method of claim 1, wherein the (d) step further comprises, when the control fails due to shortage of battery of the location measurement sensor, providing a location request message requesting the corresponding location processing agent to enter the current location.

6. The method of claim 1, wherein the (d) step further comprises, when the received location information leaves a safety zone designated by the user or enters a non-safety zone designated by the user, providing a notification message to the location information requesting terminal.

7. The method of claim 1, wherein the (d) step further comprises, when the received location information does not change for a third specific time period since the first reception of the location information at the corresponding location, providing a notification message to the location information requesting terminal.

\* \* \* \* \*